United States Patent [19]
Enlow

[11] Patent Number: 5,849,231
[45] Date of Patent: Dec. 15, 1998

[54] MELT EXTRUSION PROCESS

[75] Inventor: William P. Enlow, Belpre, Ohio

[73] Assignee: General Electric Company, New York, N.Y.

[21] Appl. No.: 38,400

[22] Filed: Mar. 29, 1993

[51] Int. Cl.$^6$ .............................. B29C 47/68; D01D 1/10; D01F 1/10
[52] U.S. Cl. ........................ 264/169; 264/211; 524/120; 524/313
[58] Field of Search ................................. 264/169, 176.1, 264/211; 524/120, 313

[56] References Cited

U.S. PATENT DOCUMENTS

| | | | |
|---|---|---|---|
| 2,604,667 | 7/1952 | Hebeler | 264/210.8 |
| 2,957,757 | 10/1960 | Coates et al. | 422/143 |
| 3,002,804 | 10/1961 | Kilian | 264/181 |
| 3,771,307 | 11/1973 | Petrille | 57/288 |
| 3,772,872 | 11/1973 | Piazza et al. | 57/243 |
| 4,134,882 | 1/1979 | Frankfort et al. | 528/308.2 |
| 4,156,071 | 5/1979 | Knox | 528/308.2 |
| 4,302,383 | 11/1981 | Valdiserri et al. | 524/105 |
| 4,305,866 | 12/1981 | York et al. | 524/119 |
| 4,371,647 | 2/1983 | Minagawa et al. | 524/120 |
| 4,403,053 | 9/1983 | Lewis | 524/91 |
| 4,413,078 | 11/1983 | Lewis et al. | 524/120 |
| 4,832,882 | 5/1989 | Moylan | 264/169 X |
| 4,888,369 | 12/1989 | Moore, Jr. | 524/100 |
| 4,994,529 | 2/1991 | Sekiguchi et al. | 525/375 |
| 4,997,888 | 3/1991 | Sekiguchi et al. | 525/333.8 |

FOREIGN PATENT DOCUMENTS

| | | |
|---|---|---|
| 2-622-590 | 5/1989 | France . |
| 19-40-621 | 3/1970 | Germany . |
| 903427 | 8/1962 | United Kingdom . |
| 1487843 | 10/1977 | United Kingdom . |
| 1574305 | 9/1980 | United Kingdom . |

OTHER PUBLICATIONS

Encyclopedia of Polymer Science & Engineering, pp. 647–675, 702–719 & 805–831, vol. 6 (undated).
Abstract of Japan 64–000,139 (Published Jan. 5, 1989).

*Primary Examiner*—Leo B. Tentoni

[57] ABSTRACT

Melt extrusion processes involving phosphite stabilized polyolefin compositions subject to solid by-product formation during melt extrusion are improved by the addition of an epoxidized ester of a fatty acid to the composition. The processes involving the improved compositions exhibit reduced levels of screen pack plugging during fiber and film extrusion processes than that achieved with fatty acid salts, such as calcium stearate.

10 Claims, 1 Drawing Sheet

MELT EXTRUSION PROCESS

BACKGROUND OF THE INVENTION

1. Field of the Invention

The present invention relates to a melt extrusion processes, and more particularly relates to melt extrusion processes for making polypropylene fibers or films.

2. Background of the Invention

Processes for making polymeric fibers and films are known, see U.S. Pat. Nos. Knox, 4,156,071, issued May 22, 1979, Frankfort et al, 4,134,882, issued Jan. 16, 1979, Piazza et al., 3,772,872, issued Nov. 20, 1973, Petrille, et al., 3,771,307, issued Nov. 13, 1973, Kilian, 3,002,804, issued Oct. 3, 1961, Coates et al., 2,957,747, issued Oct. 25, 1960, Hebeler, 2,604,667, issued Jul. 29, 1952, all of which are incorporated herein by reference, and Great Britain Patent Nos. 903427, published Aug. 15, 1962, 1487843, published Oct. 5, 1977 and 1574305, published Sep. 3, 1986, all of which are incorporated herein by reference. Phosphites are known stabilization additives for polyolefins, see York, U.S. Pat. No. 4,305,866, Lewis, U.S. Pat. No. 4,403,053, issued Sep. 6, 1983 and Valdiserri et al, U.S. Pat. No. 4,302,383, issued Nov. 24, 1981, all of which are incorporated herein by reference.

Polyolefin processors are attempting to process polymer at increasing temperatures and with increased shear and work on the polymer. They are also processing polymer which may contain polymerization catalyst residues. The total residual metal content has been decreasing in recent years but the catalyst residue may still be active.

This combination of more abusive processing conditions and the possibility of catalyst residue still being active may lead to difficulties when trying to process the polymers.

Catalyst "neutralizers" are well known in the art and are generally used in most formulations to inhibit corrosion of processing equipment resulting from catalyst residues. Typical examples would be: Ca, Zn, or Mg Stearates, Ca, Zn, or Mg oxides and synthetic hydroltalcite compositions such as a product manufactured and sold by Kyowa as DHT4A.

In many of the high temperature melt processes such as fiber spinning and film manufacture, screen packs are utilized to remove small particles which may be in the polymer prior to the polymer passing through the small orifices used in fiber and film processes. With the higher processing temperature/high shear applications there is a tendency for some combinations of polymers and additive formulations to be prone to screen pack plugging.

Specifically, it has been discovered, however, that stabilized polyolefin compositions containing residual catalysts, can generate solid byproducts during melt extrusion processes. These solids must be filtered out from the melt stream.

For example, melt stream fiber forming processes and film forming processes or the fiber and/or film forming dies will become clogged or the final articles (films/fibers) will exhibit defects and blemishes. Too much solid generation will lead to frequent filter clogging, referred to as screen pack plugging, which leads to increased processing pressures and reduced process throughput.

Consequently, there is a need for improved polyolefin compositions and improved melt extrusion processes that will exhibit reduced solid byproduct formation and a resulting reduced filter clogging and a reduced increase in processing pressure and improve throughputs.

SUMMARY OF THE PRESENT INVENTION

Figure 1:
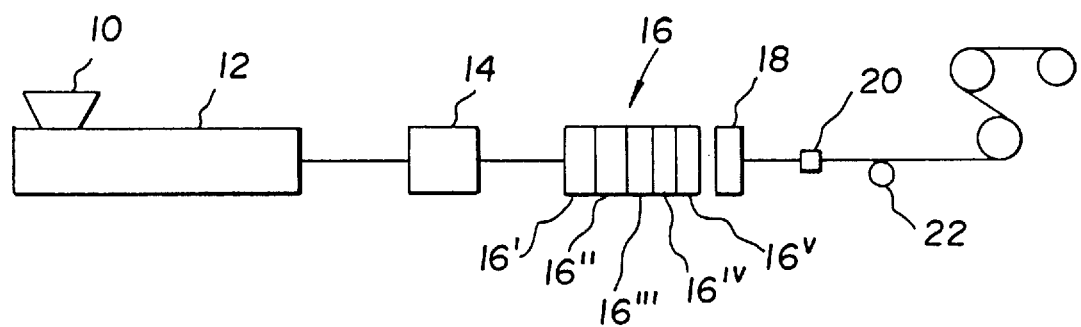
FIG. 1 is a schematic drawing of the process of the present invention for making fibers.

The present invention involves an improved polyolefin melt extrusion process that exhibits reduced filter clogging. The process involves (a) forming a polyolefin composition comprising a polyolefin resin, a phosphite stabilizer, and optionally a primary antioxidant, (b) melt extruding the composition through a filter to produce a filtered melt stream, and (c) passing the melt stream through a die to make the plastic article. The utilization of the epoxidized ester of an unsaturated fatty acid results in reduced filter clogging.

DETAILED DESCRIPTION OF THE INVENTION

The olefin polymers contemplated herein include homopolymers and copolymers of monoolefins, preferably those monoolefins containing 1–4 carbon atoms. Illustrative examples include polyethylene (including low density, high density, ultra high molecular weight and linear low density polyethylene), polypropylene, EPDM polymers, ethylene-propylene copolymers and polyisobutylene. The stabilization of mixtures of any of these olefin polymers and copolymers likewise is contemplated.

Any polypropylene resin melt extrusion process involving polymer filtration can be improved by the process of the present invention, including propylene homopolymers and random or block copolymers of propylene and an α-olefin which contain ethylene or other α-olefin in an amount from 1 to 30 wt. % as well as blends of polypropylene with other olefin polymers and copolymers, such as low and high density polyethylene, ethylene/vinyl acetate copolymer, ethylene/propylene copolymer rubbers and styrene/butadiene block-copolymer rubbers.

Phosphites may be replaced in whole or in part with a phosphonite. The compositions preferably employ a phosphorous containing component selected from the group consisting of tetrakis(2,4-di-t-butyl-phenyl)4,-4'-biphenylylene diphosphonite, tris(2,4-di-t-butylphenyl)-phosphite, trisnonylphenyl phosphite, bis(2,4-di-t-butylphenyl)pentaerythritol diphosphite, bis(distearyl) pentaerythritol diphosphite, and bis(distearyl) pentaerythritol diphosphite with one percent (1%) triethanolamine.

Phosphites may also be referred to as organic phosphite esters.

The organic phosphite ester is preferably a pentaerythritol diphosphite which in most instances is characterized by a spiro structure, i.e.,

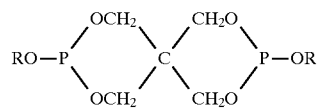

where R is an organic radical. Particularly preferred radicals (for R) are alkyl and alkylphenyl. When R is alkyl it should contain 10 to 20 carbon atoms, inclusive, and an especially desirable phosphite is distearyl pentaerythritol diphosphite, when R is alkylphenyl the alkyl substituents should contain 3 to 10 carbon atoms and, preferably, should be tertiary alkyl groups. Tertiarybutyl radicals are especially preferred. The alkylphenyl groups may contain up to three alkyl substituents. The alkyl groups preferably are bulky, i.e., tertiary or secondary alkyl groups. Such alkyl groups include isopropyl, sec-butyl, tertiarybutyl, a-amyl, tertiaryamyl, n-hexyl, 2,2-dimethylbutyl, 2-methyl-2-ethylpropyl, phenyl ethyl and tertiaryoctyl. The two alkyl groups are in the 2,4-positions or 2,6-positions. A particularly preferred species is bis-(2,4-ditertiarybutylylalkylphenyl) pentaerythritol diphosphite. Another preferred species is bis-(2,6-ditertiarybutylphenyl) pentaerythritol diphosphite. Another especially desirably phosphite is di-(2,4-ditertiarybutylphenyl)pentaerythritol diphosphite.

The phosphite esters may be made by a variety of methods. The dialkyl pentaerythritol diphosphites may be prepared via methods described in the teachings of U.S. Pat. Nos. 4,305,866, 5,137,950, 4,064,100 or other means described in the literature.

Other phosphite antioxidants which can be employed include trioctylphosphite, trilaurylphosphite, tridecylphosphite, octyl diphenylphosphite, tris(2,4-di-t-butylphenyl) phosphite, tris(nonylphenyl) phosphite, hexa (tridecyl) 1,1,3-tris(2-methyl-4-hydroxy-5-t-butylphenyl) butane triphosphite, tetra($C_{12-15}$alkyl) 4,4'-isopropylidenediphenol diphosphite, tetra(tridecyl)4,4'-butylidenebis(3-methyl-6-t-butylphenol) diphosphite, hydrogenated-4,4'-isopropylidenediphenol polyphosphite, distearyl pentaerythritol diphosphite, phenyl 4,4'-isopropylidenediphenol pentaerythritol diphosphite, bis(2,4-di-t-butylphenyl) pentaerythritol diphosphite, bis(2,6-di-t-butyl-4-methylphenyl) pentaerythritol diphosphite, di(nonylphenyl) pentaerythritol diphosphite and 4,4'-isopropylidenebis (2-t-butylphenol) di(nonylphenyl) phosphite.

Phenolic antioxidants which can be employed in the invention include, but are not limited to, 2,6-di-t-butyl-p-cresol, 2,6-di-phenyl-4-octadecyloxyphenol, stearyl(3,5-di-t-butyl-4-hydroxyphenyl)-propionate, distearyl-3,5-di-t-butyl-4-hydroxybenzylphosphonate, thio-diethylenebis(3,5-di-t-butyl-4-hydroxyphenylpropionate, hexamethylene-bis (3,5-di-t-butyl-4-hydroxyphenylpropionate, 4,4'-thiobis(6-t-butyl-m-cresol), 2-octylthio-4,6-bis(3,5-di-t-butyl-4-hydroxyphenoxy)-s-triazine, 2,2'-methylenebis(4-methyl-6-t-butylphenol),2,2'-methylene-bis(4-ethyl-6-t-butylphenol), bis(3,3-bis(4-hydroxy-3-t-butylphenyl) butylic acid) glycol ester, 4,4'-butylidenebis (6-t-butyl-m-cresol), 2,2'-ethylidenebis(4,6-di-t-butylphenol), 2,2'-ethylidenebis(4-sec-butyl-6-t-butylphenol), 3,6-dioxaoctylenebis(3-methyl-5-t-butyl-4-hydroxyphenylpropionate), 1,1,3-tris(2-methyl-4-hydroxy-5-t-butylphenyl)butane, bis(2-t-butyl-4-methyl-6-(2-hydroxy-3-t-butyl-5-methyl benzyl)phenyl) terephthalate, 1,3,5-tris(2,6-dimethyl-3-hydroxy-4-t-butylbenzyl) isocyanurate, 1,3,5-tris(3,5-di-t-butyl-4-hydroxybenzyl) isocyanurate, 1,3,5-tris(3,5-di-t-butyl-4-hydroxybenzyl)-2,4,6-trimethylbenzene, 1,3,5-tris((3,5-di-t-butyl-4-hydroxyphenyl)propionyloxyethyl)isocyanurate, tetrakis(methylene-3-(3,5-di-t-butyl-4-hydroxyphenyl)-propionate)methane.

Suitable expodized esters of unsaturated fatty acid may be made by reacting alcohols with unsaturated fatty acids to produce esters of unsaturated fatty acids, followed by epoxidizing the esters of unsaturated fatty acids. The expoxidizing may be accomplished by treating the ester of an unsaturated fatty acid with a peroxy organic acid, such as perony acetic acid. Suitable alcohols include mono-ols, diols, triols such as glycerols, and higher polyols. Suitable unsaturated fatty acids include mono and poly(di,tri, and higher)unsaturated fatty acids such as oleic acid, linoleic acid, linolenic acid, and arachidonic acid. Naturally occurring esters of unsaturated fatty acids, more particularly glycerides of unsaturated fatty acids, include vegetable oils (chiefly from seeds or nuts), including soybean oil, linseed oil, and cottonseed oil. Generally unsaturated fatty acids have from 4 to 24 carbon atoms. The most preferred epoxidized ester of unsaturated fatty acid is epoxidized soybean oil. Soybean oil is predominantly triglycerides of oleic acid, triglycerides of linoleic acid and triglycerides of linolenic acid.

The polyolefin resin compositions preferably comprise from 50 to 99.9 weight percent polyolefin resin, more preferably from 90 to 99.5 weight percent thereof, and most preferably from 95 to 99 weight percent thereof based on the total weight of the composition; from 0.01 to 5 weight percent phosphite, more preferably from 0.05 to 3 weight percent thereof, and most preferably from 0.1 to 1 weight percent thereof based on the total weight of the composition; and preferably comprises from 0.01 to 5 weight percent epoxided ester of an unsaturated fatty acid, more preferably from 0.05 to 3 weight percent thereof, and most preferably from 0.1 to 1 weight percent thereof based on the total weight of the composition.

The composition may also contain or be free of other additives such as waxes, antistatic agents, flame retardants, nucleating agents, plasticizers, hindered amine light stabilizers, and hindered phenolic antioxidants. Preferably the composition contains a hindered phenolic antioxidant at a level of from 0.001 to 5 weight percent, more preferably at a level of from 0.005 to 3 weight percent thereof, and most preferably at a level of from 0.025 to 0.3 weight percent thereof based on the total weight of the composition.

Polyolefin fibers are typically made by melt spinning processes. Melt spinning requires that the polyolefin polymers be stable at temperatures sufficiently above the melting point or softening point of the polyolefin to be extruded in the molten state without substantial degradation. The melt spinning process employs a spinneret, which is a plate containing orifices through which molten polymer is extruded under pressure. Typically the spinneret is made of stainless steel or a nickel alloy. The spinneret is a flat plat, flush with or recessed in its mounting. Spinnerets for molten polymers are usually from 3 mm to 10 mm thick, for melt process pressures of up to 3000 psi. Fibers forming spinneret holes may have exit diameters of from 175 to 750 microns. The number of holes in the spinneret may range from a few to several thousand. A typical process is shown schematically in FIG. 1, wherein the polyolefin composition in particulate form is fed via a hopper 10 to a screw type extruder 12 wherein the composition is melted at elevated temperatures to form a melt stream which is forced at elevated pressures to a metering pump 14 which controls the flow. Optionally, there may be a filtration unit (not shown) at the exit of the extruder 12. The melt stream is then forced through a filter 16, preferably a screen pack filter of filters in series ($16^i$, $16^{ii}$, $16^{iii}$, $16^{iv}$, 16') with the upstream filters being of a mesh for collecting only large particles and subsequent downstream filters being increasingly fine for collecting smaller particles that pass through the upstream filters, which removes unmelted solids prior to the melt stream reaching the spinneret 18. The filtered use of stream is then forced to the spinneret 18 wherein fibers are formed by passing the melt stream through the die holes of the spinneret. The fibers are then air cooled and converged into the convergence guide 20, then directed to the finish application 22, reels 24, 26, and finally to the spin bobbin 28 wherein the fiber is wound for storage.

Before reaching the spinneret, the molten polymer is filtered through a series of sintered or fibrous metal gauzes or a bed of graded fine refractory material, such as sand or alumina, held in place by metal screens. Filtration removes large solid or gel particles that might otherwise block spinneret holes or, if passed through, occupy sufficient cross-sectional area in the filament to affect its processing or tensile properties. Smaller particles, such as delusterants, are not retained by the filter. Filtration also provides shearing, and thus can influence Theological behavior.

Figure 2:
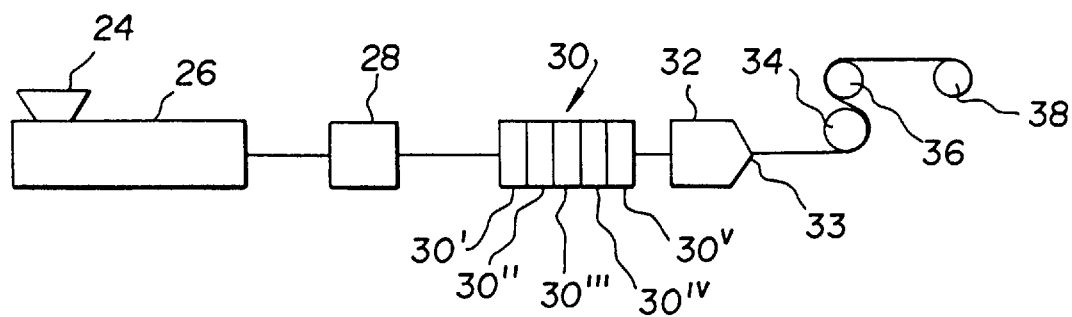
FIG. 2 is a schematic drawing of the process of the present invention for making films.

As shown in FIG. 2, a film making process may involve feeding polyolefin particulates (pellets or powder) to a hopper 24 of a screw type extruder 26 wherein the particulates are melted and forced to a metering pump 28 (optional) and then forced through a filtering system (preferably a screen pack) 30 which preferably has a series of filters (30$^i$, 30$^{ii}$, 30$^{iii}$, 30$^{iv}$ and 30$^v$) which have increasingly fines mesh as the polyolefic melt flows downstream. The filter screens out the unmelted solid by-products before the polyolefin melt stream reaches the die 32 so that the dies orifice 33 will not become clogged by the solid by-products. The melt stream flows from the filter system 30 to the die 32, through the elongated die orifice 33, forming a polyolefin film which then passed partially around and between calendar rolls 34, 36 to storage roll 38 whereupon the film is wound and stored.

EXAMPLES

Example 1 was a polypropylene composition containing 500 parts per million by weight (ppm) bis(2,4-di-tert-butylphenyl) pentaerythritol diphosphite (sold under the trademark ULTRANOX® 626 by GE Specialty Chemicals Inc.), 250 ppm of a hindered phenolic compound (sold under the trademark IRGANOX® 3114 by B. F. Goodrich), 250 ppm Epoxidized Soybean Oil, and 250 ppm Calcium Stearate. The polypropylene base resin used in the compositions of the examples was Himont Profax 6301 resin.

Comparative Example 2 has a polypropylene composition containing 500 ppm of Calcium Stearate, 500 ppm of bis(2,4-di-tert-butylphenyl) pentaerythritol phosphite, 250 ppm of hindered phenolic compound (Irganox 3114).

Test method—Polypropylene is compounded with additives. Our laboratory compound method 450° F. stock temperature using a 24:1 L/D 1" 2 stage screw with a Maddox mixer between stages. A screen pack composed of 20/100/500/100/20 mesh screens is utilized. Polypropylene is reextruded using a ¾" Brabender extruder with a single stage screw 2:1 compression having a Maddox mixer 6" from the screw tip. The output of the extruder is throttled to a ¼" diameter focus on a screen pack. The screen pack is composed of 20/100/1400×125/100/20 screens. Back pressure is set to 200–300 psi.

The extrusion is performed at 600° F. stock temperature operating the extruder at 10 rpm for 50 min and 50 rpm for 10 minutes out of every hour. Back pressure is set at 200–300 psi. The extrusion is performed until significant pressure rise occurs or if none is observed for 13–16 hrs.

TABLE 1

| Examples | Ex 1 | CEx2 |
| --- | --- | --- |
| Back Pressure Increase, psi | 0(13hrs) + | 500(8hrs) |

Note that the examples of the present invention exhibited no back pressure increase after 13 hours of operation whereas the comparative example exhibited a+500 psi increase in back pressure after only 8 hours.

Typical filter mesh sizes are from 20 mesh to 1000 mesh, for example, 20 mesh, 100 mesh and 500 mesh. The higher the mesh number the finer the filtration. The process of the present invention preferably employs a filter fineness of at least 20 mesh, more preferably at least 100 mesh, more preferably at least 500 mesh and most preferably in series of 20 mesh, 100 mesh and 500 mesh so that the upstream filters filter out the largest particles and the downstream filters filter out the fine particles.

Example 3 was the same composition as Example 1, except 100 ppm of DHTAA hydrotalacite was used in place of the 250 ppm of Calcium Stearate. The Example 3 composition exhibited no plugged screen pack pressure increase after 13 hours of operation.

Example 4 was the same as Example 1 except the composition of Example 4 contained in addition 100 ppm of DHT4A hydrotalacite. The example 4 exhibited no plugged screen pack pressure increase after 13 hours of operation.

What is claimed is:

1. An extrusion process for making plastic articles, said process comprising:
   a) forming a polyolefin composition comprising a polyolefin resin, a phosphite stabilizer, and at least one epoxidized ester of a fatty acid,
   b) melt extruding said composition through a filtration system to produce a filtered polyolefin melt stream,
   c) passing said melt stream through a die to make the plastic article, wherein said phosphite is a bis(2,4-di-tert-butylphenyl)pentaerythritol diphosphite.

2. The process of claim 1 wherein said polyolefin is polypropylene.

3. A melt extrusion process for making polypropylene fibers, said process comprising:
   a) forming a polypropylene composition comprising a polypropylene resin, bis(2,4-di-tert-butylphenyl) pentaerythritol diphosphite, and an epoxidized ester of a fatty acid,
   b) melting said composition to form a melted composition,
   c) filtering said melted composition to remove unmelt solids,
   d) passing said filtered composition through a fiber forming die orifice to produce polypropylene fiber.

4. The process of claim 3 wherein said filtering comprises forcing the melted composition through a screen pack comprising at least two screen filters, wherein at least one screen has a mesh size greater than 100 and at least one screen has a mesh size of less than 100.

5. The process of claim 3 wherein said composition comprises from 90 to 99.5 weight percent of said polypropylene resin, from 0.05 to 3 weight percent of said phosphite, and from 0.05 to 3 weight percent of said epoxidized ester of a fatty acid based on the total weight of said composition.

6. The process of claim 3 wherein said composition comprises from 95 to 99 weight percent of said polypropylene resin, from 0.01 to 1 weight percent of said phosphite, and from 0.01 to 1 weight percent of said epoxidized ester of fatty acid based on the total weight of said composition.

7. The process of claim 3 wherein said composition further comprises from 0.05 to 3 weight percent of a hindered phenolic antioxidant based on the total weight of the composition.

8. The process of claim 3 wherein said epoxidized ester of fatty acid is epoxidized soybean oil.

9. The process of claim 3 wherein said composition consists essentially of said polypropylene resin, said bis(2, 4-di-tertbutylphenyl)pentaerythritol diphosphite resin, and said epoxidized ester of fatty acid.

10. A melt extrusion process for making polypropylene fibers, said process consisting essentially of:

a) forming a polypropylene composition comprising a polypropylene resin, bis(2,4-di-tert-butylphenyl) pentaerythritol diphosphite, and an epoxidized ester of fatty acid, b) melting said composition to form a melted composition, c) filtering said melted composition to remove unmelt solids, d) passing said filtered composition through a fiber forming die orifice to produce polypropylene fiber.

* * * * *